(12) United States Patent
Yoshioka et al.

(10) Patent No.: US 12,132,684 B2
(45) Date of Patent: Oct. 29, 2024

(54) COMMUNICATION APPARATUS AND CHANNEL STATE INFORMATION MEASURING METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 31 days.

(21) Appl. No.: 17/413,093

(22) PCT Filed: Dec. 27, 2018

(86) PCT No.: PCT/JP2018/048380
§ 371 (c)(1),
(2) Date: Jun. 11, 2021

(87) PCT Pub. No.: WO2020/136853
PCT Pub. Date: Jul. 2, 2020

(65) Prior Publication Data
US 2022/0014338 A1 Jan. 13, 2022

(51) Int. Cl.
*H04L 5/00* (2006.01)
*H04W 72/20* (2023.01)

(52) U.S. Cl.
CPC .......... *H04L 5/0057* (2013.01); *H04W 72/20* (2023.01)

(58) Field of Classification Search
CPC .................. H04L 5/0057; H04W 72/1278

USPC ......................................................... 370/329
See application file for complete search history.

(56) References Cited

U.S. PATENT DOCUMENTS

| 11,006,481 B2* | 5/2021 | Lee ......................... H04W 88/04 |
| 11,272,467 B2* | 3/2022 | Chae ....................... G01S 19/256 |
| 2016/0100419 A1 | 4/2016 | Wang | |
| 2020/0022089 A1* | 1/2020 | Guo ........................ H04W 24/08 |
| 2021/0385842 A1* | 12/2021 | Zhao ....................... H04L 5/0053 |

FOREIGN PATENT DOCUMENTS

| JP | 2016-527762 A | | 9/2016 | |
| WO | 2017/171447 A3 | | 10/2017 | |
| WO | WO 2020/033704 | * | 8/2018 | ............... H04L 5/00 |
| WO | 2018/203669 A1 | | 11/2018 | |

OTHER PUBLICATIONS

Office Action issued in the counterpart Japanese Patent Application No. 2020-562255, mailed on May 31, 2022 (4 pages).

(Continued)

*Primary Examiner* — Christopher R Crompton
(74) *Attorney, Agent, or Firm* — Osha Bergman Watanabe & Burton LLP

(57) ABSTRACT

There is provided a communication apparatus including a receiving unit that receives a request signal for requesting to measure sidelink channel state information; a control unit that derives the sidelink channel state information based on a signal that is transmitted from a transmitting communication apparatus via a sidelink and received by the receiving unit, based on the request signal; and a transmitting unit that transmits the derived sidelink channel state information.

6 Claims, 13 Drawing Sheets

(56) References Cited

OTHER PUBLICATIONS

Ericsson; "On PHY procedures to support unicast and groupcast on NR sidelink"; 3GPP TSG-RAN WG1 Meeting #95, R1-1813639; Spokane, WA, US, Nov. 12-16, 2018 (8 pages).
International Search Report issued in Application No. PCT/JP2018/048380, mailed on Mar. 26, 2019 (5 pages).
Written Opinion issued in International Application No. PCT/JP2018/048380, mailed on Mar. 26, 2019 (4 pages).
3GPP TS 38.213 V15.3.0, Release 15; "3rd Generation Partnership Project; Technical Specification Group Radio Access Network; NR; Physical layer procedures for control;" Sep. 2018; Sophia Antipolis Valbonne, France (101 pages).
3GPP TS 38.211 V15.3.0, Release 15; "3rd Generation Partnership Project; Technical Specification Group Radio Access Network; NR; Physical channels and modulation;" Sep. 2018; Sophia Antipolis Valbonne, France (96 pages).
3GPP TS 38.331 V15.3.0, Release 15; "3rd Generation Partnership Project; Technical Specification Group Radio Access Network; NR; Radio Resource Control (RRC) protocol specification;" Sep. 2018; Sophia Antipolis Valbonne, France (445 pages).
Extended European Search Report issued in counterpart European Patent Application No. 18945265.9, mailed on Jul. 1, 2022 (13 pages).
Intel Corporation; "Sidelink Feedback Information and Signaling for Wearable and IoT Use Cases"; 3GPP Tsg Ran WG1 Meeting #90, R1-1712521; Prague, Czech Republic, Aug. 21-25, 2017 (5 pages).
Intel, Huawei, HiSilicon; "WF on Signalling for FeD2D"; 3GPP TSG RAN WG1 Meeting #90, R1-1714850; Prague, Czech Republic, Aug. 21-25, 2017 (3 pages).
Office Action issued in counterpart Chinese Patent Application No. 201880100298.X mailed on Nov. 25, 2023 (11 pages).
Office Action issued in counterpart Chinese Patent Application No. 201880100298.X mailed on Apr. 11, 2024 (14 pages).

* cited by examiner

COMMUNICATION APPARATUS AND CHANNEL STATE INFORMATION MEASURING METHOD

TECHNICAL FIELD

The present invention relates to a communication apparatus and a channel state information measuring method for a radio communication system.

BACKGROUND ART

For Long Term Evolution (LTE) and a LTE successor system (e.g., LTE-Advanced (LTE-A), New Radio (NR) (which is also referred to as 5G)), sidelink (which is also referred to as Device to Device (D2D)) technology has been studied in which communication apparatuses, such as User Equipment (UE), directly communicate with each other without going through a base station (Non-Patent Document 1).

In addition, implementation of (Vehicle to Everything (V2X)) has been studied and technical specification documents have been developed. Here, V2X is a part of Intelligent Transport Systems (ITS) and, as illustrated in FIG. 1, V2X is a generic term for Vehicle to Vehicle (V2V), which implies a communication mode executed between vehicles; Vehicle to Infrastructure (V2I), which implies a communication mode executed between a vehicle and a rode-side unit (RSU: Road-Side Unit); Vehicle to Nomadic device (V2N), which implies a communication mode executed between a vehicle and a driver's mobile communication apparatus; and a Vehicle to Pedestrian (V2P), which implies a communication mode executed between a vehicle and a pedestrian's mobile communication apparatus.

RELATED ART DOCUMENT

Non-Patent Document

Non-Patent Document 1: 3GPP TS 38.213 V15.3.0 (2018-09)
Non-Patent Document 2: 3GPP TS 38.211 V15.3.0 (2018-09)
Non-Patent Document 3: 3GPP TS 38.331 V15.3.0 (2018-09)

SUMMARY OF THE INVENTION

Problem to be Solved by the Invention

By causing a communication apparatus performing sidelink communication to measure a signal received via a sidelink, and by transmitting, to a base station, for example, sidelink channel state information by the communication apparatus, scheduling of sidelink communication can be performed more appropriately.

There is a need for a technique with which a communication apparatus performing sidelink communication can be caused to measure a signal received via a sidelink, and with which the communication apparatus can be caused to transmit sidelink channel state information.

Means for Solving the Problem

According to an aspect of the present invention, there is provided a communication apparatus including a receiving unit that receives a request signal for requesting to measure sidelink channel state information; a control unit that derives the sidelink channel state information based on a signal that is transmitted from a transmitting communication apparatus via a sidelink and received by the receiving unit, based on the request signal; and a transmitting unit that transmits the derived sidelink channel state information.

Advantage of the Invention

According to an embodiment, a technique is provided with which a communication apparatus performing sidelink communication can be caused to measure a signal received via a sidelink, and with which the communication apparatus can be caused to transmit sidelink channel state information.

BRIEF DESCRIPTION OF DRAWINGS

FIG. 8B is a diagram illustrating an overview of an SL transmission mode 2a.

EMBODIMENTS OF THE INVENTION

In the following, embodiments of the present invention (the embodiments) are described with reference to the drawings. The embodiments described below are merely examples, and the embodiments to which the present invention is applied are not limited to the following embodiments.

A method of direct communication between communication apparatuses according to the present embodiment is assumed to be LTE or NR sidelink (SL (Sidelink)), but the method of direct communication is not limited to this method. Additionally, the name "sidelink" is an example and UL (Uplink) may include a function of SL without using the name "sidelink." SL may be distinguished from DL (Downlink) or UL by a difference in frequency or time resource and SL may have another name.

UL and SL may also be distinguished by a difference in one or more combinations of time resources, frequency resources, time and frequency resources, reference signals referenced to determine a pathloss in transmission power control, and reference signals used to synchronize (PSS/SSS/PSSS/SSSS).

For example, for UL, a reference signal of an antenna port X is used as a reference signal to be referenced to determine a Pathloss in transmission power control, and for SL (including UL used as SL), a reference signal of antenna port Y is used as a reference signal to be referenced to determine a Pathloss in transmission power control.

In the embodiments, it is mainly assumed that a communication apparatus is installed in a vehicle, but embodiments of the present invention are not limited to the embodiments. For example, a communication apparatus may be a communication apparatus carried by a person, a communication apparatus may be a device installed in a drone or an aircraft, or a communication apparatus may be a base station, an RSU, a relay station (relay node), user equipment having a scheduling capability, or the like.

(Outline of Sidelink)

In the embodiments, a sidelink is used as basic technology. Accordingly, as a basic example, an outline of a sidelink is described. Examples of the techniques described herein are those specified in 3GPP Rel. 14, or the like. The technique may be used in NR, or a different technique may be used in NR.

Figure 1:
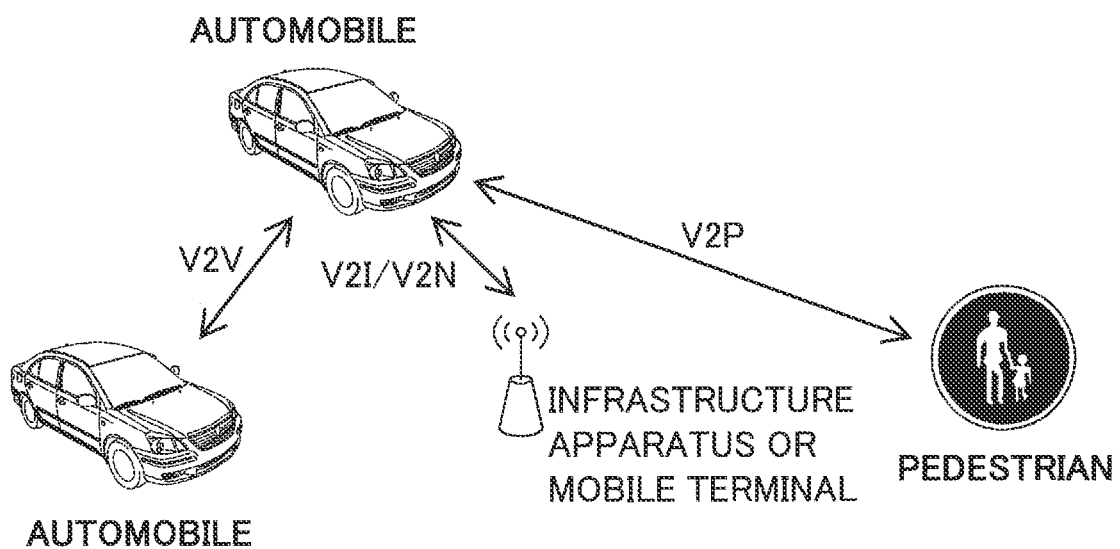
FIG. 1 is a diagram for illustrating V2X.
Figure 2A:
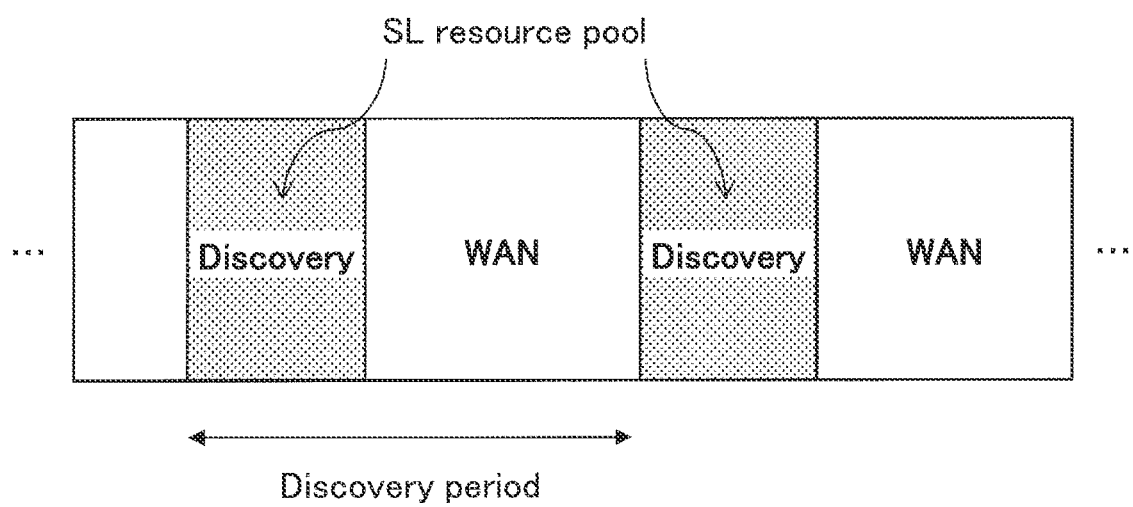
FIG. 2A is a diagram for illustrating a sidelink.

When the sidelink is broadly divided, the sidelink includes "discovery" and "communication." For "discovery," as illustrated in FIG. 2A, a resource pool for a Discovery message is configured for each Discovery period, and a communication apparatus (called UE) transmits a Discovery message (discovery signal) within that resource pool. More specifically, Type 1 and Type 2b are available. In Type 1, a communication apparatus autonomously selects a transmitting resource from the resource pool. In Type 2b, quasi-static resources are allocated by higher-layer signaling (e.g., RRC signals).

Figure 2B:
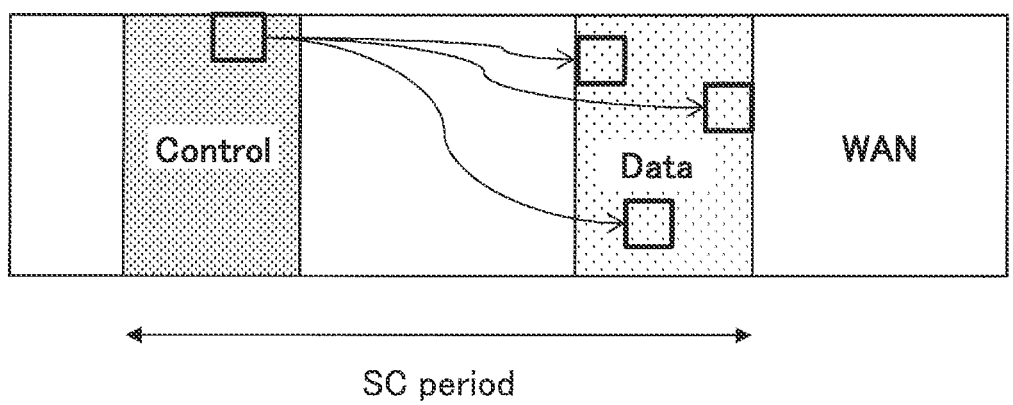
FIG. 2B is a diagram for illustrating a sidelink.

As illustrated in FIG. 2B, for "communication," a resource pool for SCI (Sidelink Control Information)/data transmission is periodically configured. A transmitting communication apparat signals a data transmission resource (PSSCH resource pool) or the like to a receiving side by SCI with a resource selected from a Control resource pool (PSSCH resource pool) and transmits the data using the data transmission resource. For Communication, more specifically, there are modes 1 and 2. In mode 1, resources are dynamically assigned by (Enhanced) Physical Downlink Control Channel ((E) PDDCH) transmitted from a base station to a communication apparatus. In mode 2, a communication apparatus autonomously selects a transmission resource from the resource pool. As the resource pool, a predefine pool is used, such as that signaled by SIB.

Furthermore, Rel-14 includes, in addition to mode 1 and mode 2, mode 3 and mode 4. In Rel-14, SCI and data can be simultaneously (in one subframe) transmitted in adjacent resource blocks in a frequency direction. Here, the SCI may be referred to as SA (scheduling assignment).

A channel used for "discovery" is referred to as Physical Sidelink Discovery Channel (PSDCH), a channel used for transmitting control information, such as SCI in "communication," is referred to as Physical Sidelink Control Channel (PSCCH), and a channel for transmitting data may be referred to as Physical Sidelink Shared Channel (PSSCH). PSCCH and PSSCH have a structure based on PUSCH, and DMRS (Demodulation Reference Signal) is inserted in the structure.

Figure 3:
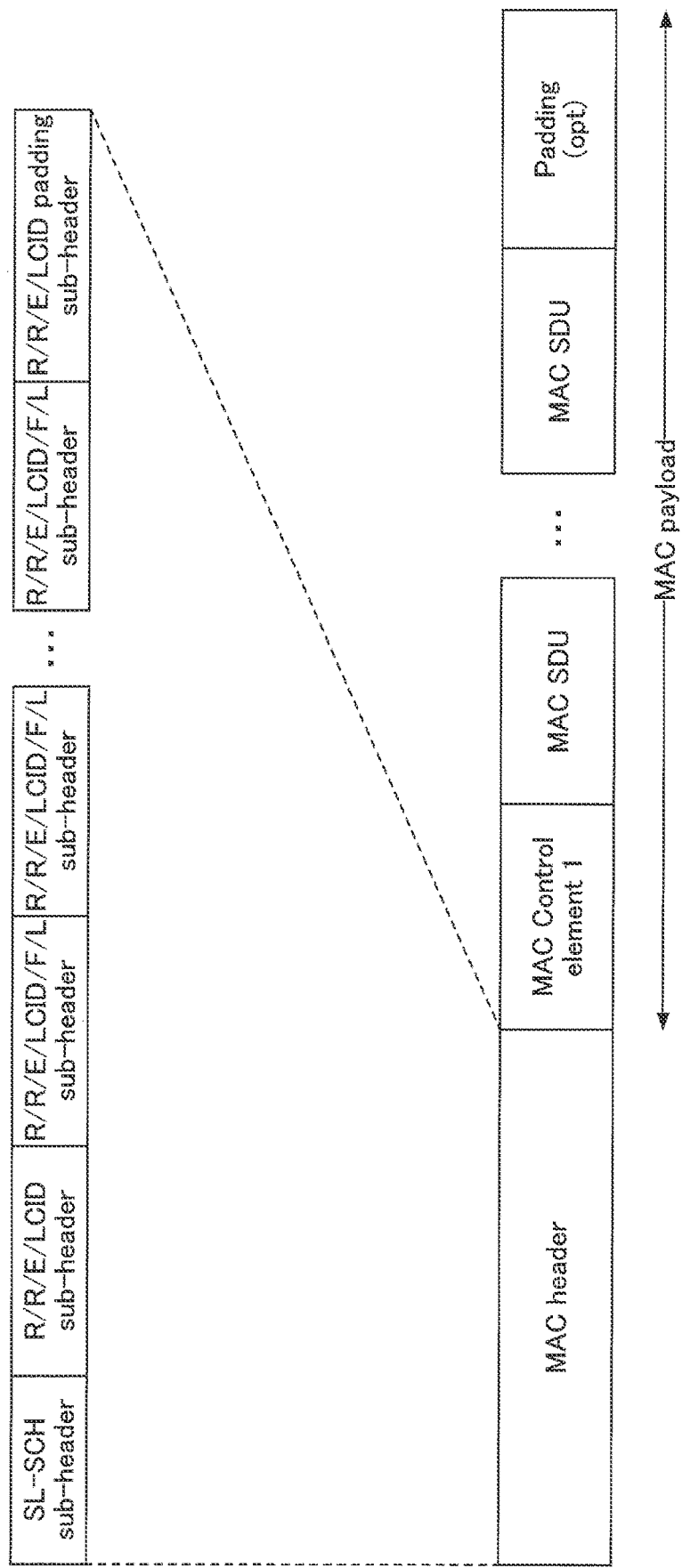
FIG. 3 is a diagram for illustrating a MAC PDU used for sidelink communication.

A Medium Access Control (MAC) Protocol Data Unit (PDU) used for sidelink includes at least a MAC header, MAC Control element, MAC SDU (Service Data Unit), and padding, as illustrated in FIG. 3. The MAC PDU may include any other information. A MAC header includes one Sidelink Shared Channel (SL-SCH) subheader and one or more MAC PDU subheadrs.

Figure 4:
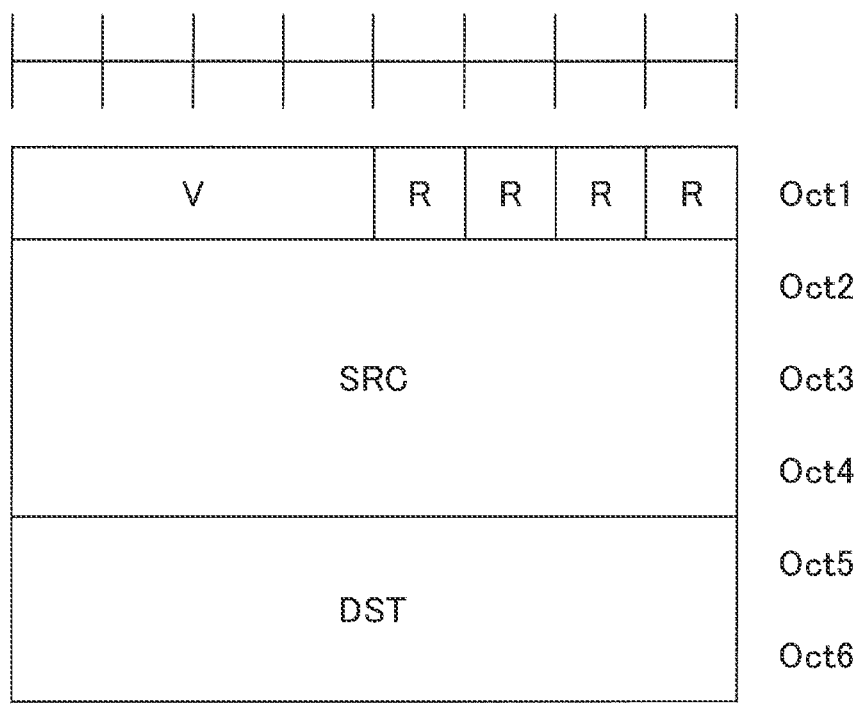
FIG. 4 is a diagram for illustrating a format of an SL-SCH subheader.

As illustrated in FIG. 4, a SL-SCH subheader includes a MAC PDU format version (V), source information (SRC), destination information (DST), Reserved bit (R), and the like. V is allocated at a start of the SL-SCH subheader and V indicates a MAC PDU format version used by a communication apparatus. In the source information, information on a transmission source is configured. In the transmission source information, an identifier of a ProSe UE ID is configured. In the destination information, information on a transmission destination is configured. Transmission destination information may be configured with information on a ProSe Layer-2 Group ID of the transmission destination.

Figure 5:
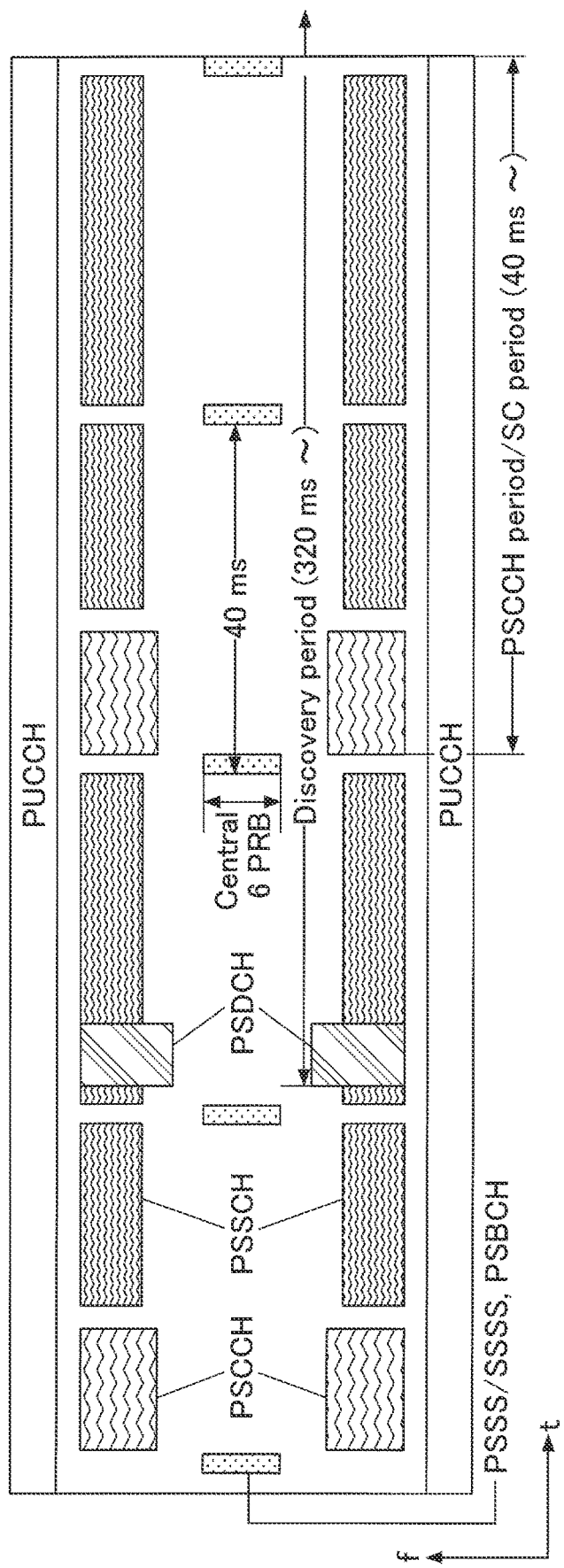
FIG. 5 is a diagram for illustrating an example of a channel structure used in a sidelink.

An example of a sidelink channel structure is illustrated in FIG. 5. As illustrated in FIG. 5, a PSCCH resource pool and a PSSCH resource pool used for "communication" are assigned. The PSDCH resource pool used for "discovery" is assigned with a period longer than a channel period of "communication."

Furthermore, PSSS (Primary Sidelink Synchronization signal) and SSSS (Secondary Sidelink Synchronization signal) are used as synchronization signals for sidelink. For example, for an out-of-coverage operation, PSBCH (Physical Sidelink Broadcast Channel) is used, which is for transmitting broadcast information, such as a sidelink system bandwidth, a frame number, resource configuration information. PSSS/SSSS and PSBCH are transmitted, for example, in a single subframe. PSSS/SSSS may be referred to as SLSS.

The V2X assumed in the embodiments is a scheme related to "communication." However, in the embodiments, there may be no distinction between "communication" and "discovery." Furthermore, the techniques according to the embodiments may be applied to "discovery."

(System Configuration)

Figure 6:
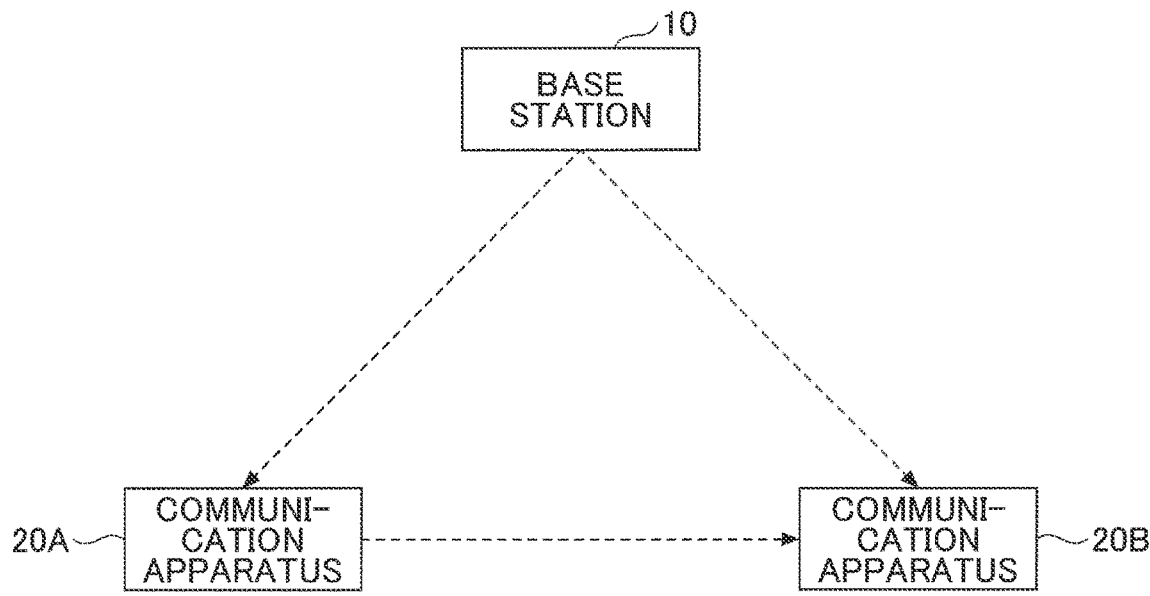
FIG. 6 is a diagram illustrating a configuration example of a radio communication system according to an embodiment.

FIG. 6 is a diagram illustrating an example of a configuration of a radio communication system according to the embodiments. As illustrated in FIG. 6, a radio communication system according to the embodiments includes a base station 10, a communication apparatus 20A, and a communication apparatus 20B. Note that, in practice, there may be a large number of communication apparatuses, but FIG. 6 illustrates the communication apparatus 20A and the communication apparatus 20B as an example.

In FIG. 6, the communication apparatus 20A is intended to be the transmitting side and the communication apparatus 20B is intended to be the receiving side. However, each of the communication apparatus 20A and the communication apparatus 20B is provided with both transmission function and reception function. In the following, when the communication apparatuses 20A, 20B, and the like, are not particularly distinguished, they are simply described as the communication apparatus 20 or the communication apparatus. In FIG. 6, for example, a case is indicated in which both the communication apparatus 20A and the communication apparatus 20B are within the coverage. However, the operation according to the embodiments can be applied to a case in which all the communication apparatuses 20 are within the coverage; a case in which some of the communication apparatuses 20 are within the coverage and other communication apparatuses 20 are outside the coverage; and a case in which all the communication apparatuses 20 are outside the coverage.

In the embodiments, the communication apparatus 20 is, for example, a device installed in a vehicle such as an automobile and has a function of cellular communication as user equipment (UE) in the LTE or NR and a sidelink function. Additionally, the communication apparatus 20 includes functions, such as a GPS device, a camera, and various types of sensors, for obtaining report information (location, event information, and so forth). The communication apparatus 20 may be a typical mobile communication apparatus (such as a smartphone). The communication apparatus 20 may be an RSU. The RSU may be a UE-type RSU with UE functions, a BS-type RSU with base station functions (also referred to as gNB-type UE), or a relay station.

The communication apparatus 20 need not be a single-housing device. For example, even if various types of sensors are distributed in a vehicle, the device including the various types of sensors is the communication apparatus 20. The communication apparatus 20 need not include various types of sensors, and the communication apparatus 20 may include a function for transmitting data to and receiving data from the various types of sensors.

The details of processing of sidelink transmission by the communication apparatus 20 are basically the same as the details of processing of UL transmission in the LTE or NR. For example, the communication apparatus 20 scrambles a code word of transmission data, modulates to generate complex-valued symbols, and maps the complex-valued symbols to one or two layers for precoding. The precoded complex-valued symbols are then mapped to a resource element to generate a transmission signal (e.g., CP-OFDM, DET-s-OFDM) and the transmission signal is transmitted from each antenna port.

The base station 10 has a function of cellular communication as the base station 10 in LTE or NR, and the base station 10 has a function for enabling communication of the communication apparatus 20 according to the embodiments (e.g., resource pool configuration, resource allocation, and the like). The base station 10 may be an RSU (gNB-type RSU), a relay station, or a communication apparatus having a scheduling function.

In the radio communication system according to the embodiments, a signal waveform used by the communication apparatus 20 for SL or UL may be OFDMA, SC-FDMA, or other signal waveforms. In the radio communication system according to the embodiments, as an example, a frame including a plurality of subframes (e.g., 10 subframes) is formed in the time direction, and the frequency direction is formed of a plurality of subcarriers. One subframe is an example of one transmission Time Interval (TTI). However, TTIs are not necessarily subframes. For example, a TTI may be in units of slots or mini-slots or other time domain units. In addition, the number of slots per subframe may be determined in accordance with subcarrier spacing. The number of symbols per slot may be 14.

In the embodiments, the communication apparatus 20 may take any of the following modes: a mode 1 in which resources are dynamically assigned by (Enhanced) Physical Downlink Control Channel ((E) PDDCH) transmitted from the base station 10 to the communication apparatus; a mode 2 in which the communication apparatus autonomously selects transmission resources from the resource pool; a mode (which is referred to as mode 3, hereinafter) in which resources for SL signal transmission are assigned by the base station 10; and a mode (which is referred to as mode 4, hereinafter) in which resources for SL signal transmission are autonomously selected. For example, a mode is configured for the communication apparatus 20 by the base station 10.

Figure 7:
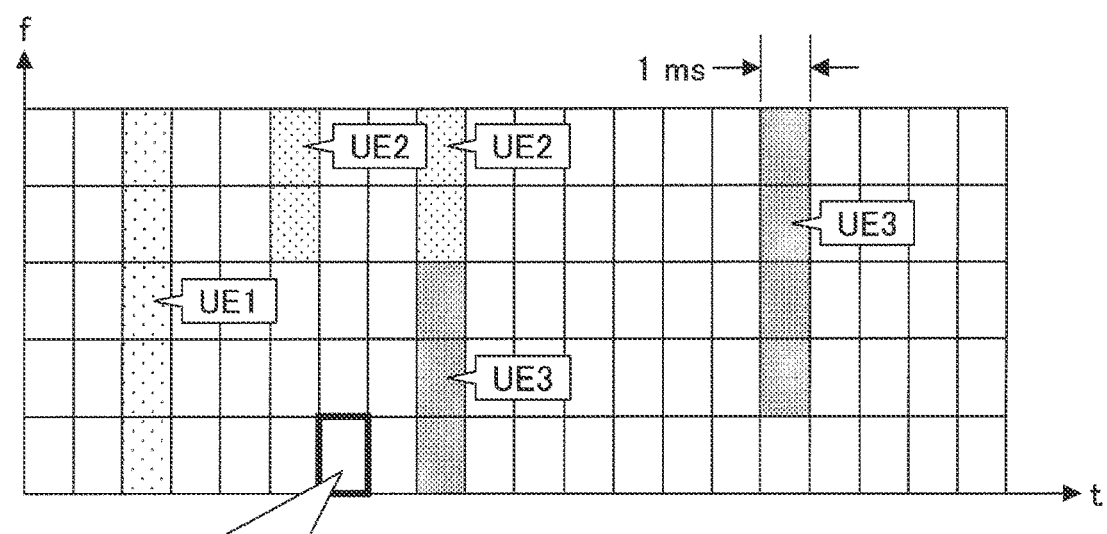
FIG. 7 is a diagram for illustrating a resource selection operation of a communication apparatus.

As illustrated in FIG. 7, the communication apparatus of mode 4 (indicated as UE in FIG. 7) selects radio resources from a synchronized common time and frequency grid. For example, the communication apparatus 20 senses in the background to identify, as candidate resources, resources with good sensing results that are not reserved by another communication apparatus and selects, from the candidate resources, a resource to be used for transmission.

(Overview of NR V2X)

In NR V2X, transmission modes are specified that are the same as SL transmission mode 3 and SL transmission mode 4 that are specified in LTE V2X.

In the following, an outline of transmission modes defined by NR V2X is described with reference to FIG. 8A to FIG. 8D.

Figure 8A:
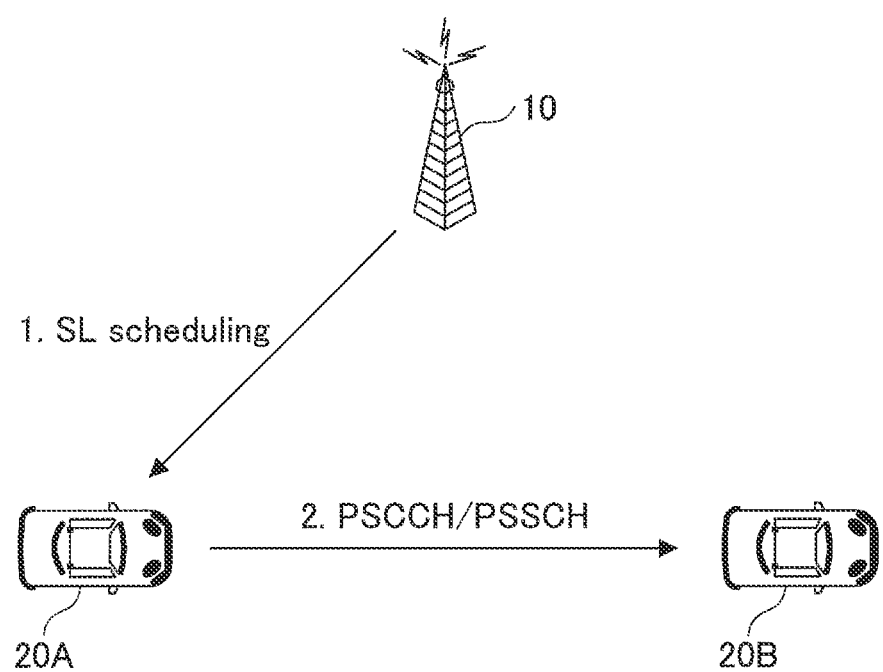
FIG. 8A is a diagram illustrating an overview of an SL transmission mode 1 specified in NR V2X.

FIG. 8A is a diagram illustrating an overview of SL transmission mode 1 specified in NR V2X. SL transmission mode 1 specified in NR V2X corresponds to SL transmission mode 3 specified in LTE V2X. In the SL transmission mode 1 specified in NR V2X, the base station 10 schedules a transmission resource and assigns the transmission resource to the transmitting communication apparatus 20A. The communication apparatus 20A transmits a signal to the receiving communication apparatus 20B by using the assigned transmission resource.

Figure 8B:
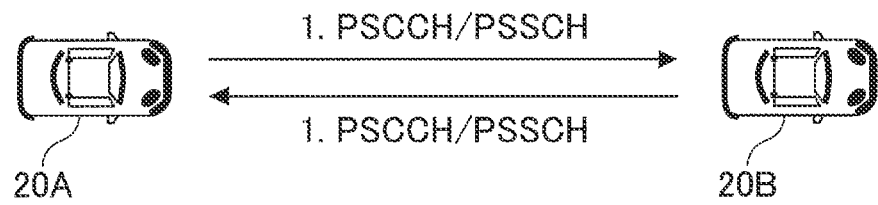
Figure 8C:
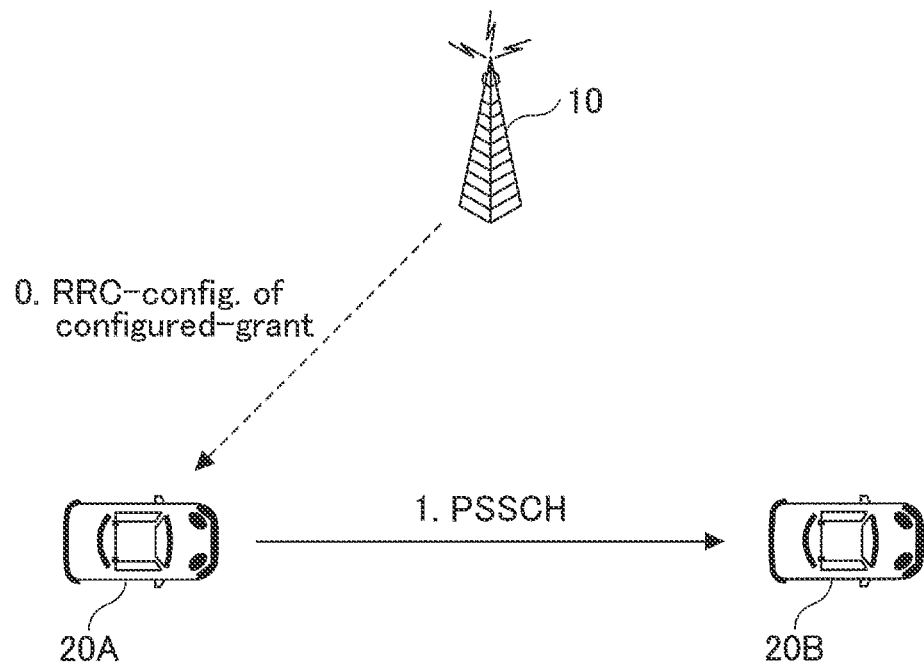
FIG. 8C is a diagram illustrating an overview of an SL transmission mode 2c.
Figure 8D:
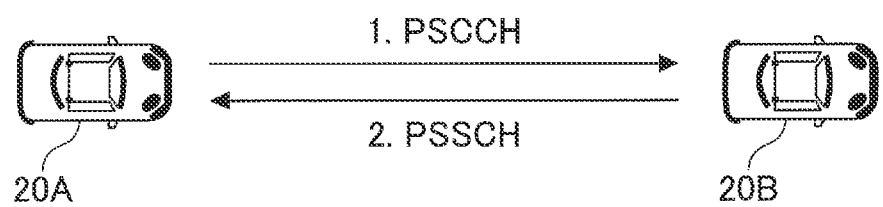
FIG. 8D is a diagram illustrating an overview of an SL transmission mode 2d.

FIG. 8B, FIG. 8C and FIG. 8D are diagrams illustrating an overview of SL transmission mode 2 as specified in NR V2X. SL transmission mode 2 specified in NR V2X corresponds to SL transmission mode 4 specified in LTE V2X.

FIG. 8B is a diagram illustrating an overview of SL transmission mode 2a. In SL transmission mode 2a, for example, the transmitting communication apparatus 20A autonomously selects a transmission resource and transmits a signal to the receiving communication apparatus 20B by using the selected transmission resource.

FIG. 8C is a diagram illustrating an outline of SL transmission mode 2c. In the SL transmission mode 2c, for example, the base station 10 preconfigures transmitting resources with a certain period to the communication apparatus 20A, and the communication apparatus 20A transmits a signal to the receiving communication apparatus 20B by using the transmitting resources with the predetermined period. Here, instead of the base station 10 preconfiguring the transmitting resources with the certain period to the communication apparatus 20A, for example, the transmitting resources with the certain period may be configured to the communication apparatus 20A according to a specification.

FIG. 8D is a diagram illustrating an overview of SL transmission mode 2d. In SL transmission mode 2d, for example, the communication apparatus 20 performs an operation that is the same as an operation of the base station 10.

Specifically, the communication apparatus 20A schedules transmission resources and assigns the transmission resources to the receiving communication apparatus 20A. The communication apparatus 20B may transmit, to another communication apparatus 20, a signal using the assigned communication resources. Namely, the communication apparatus 20A may control transmission of another communication apparatus 20.

Figure 9A:
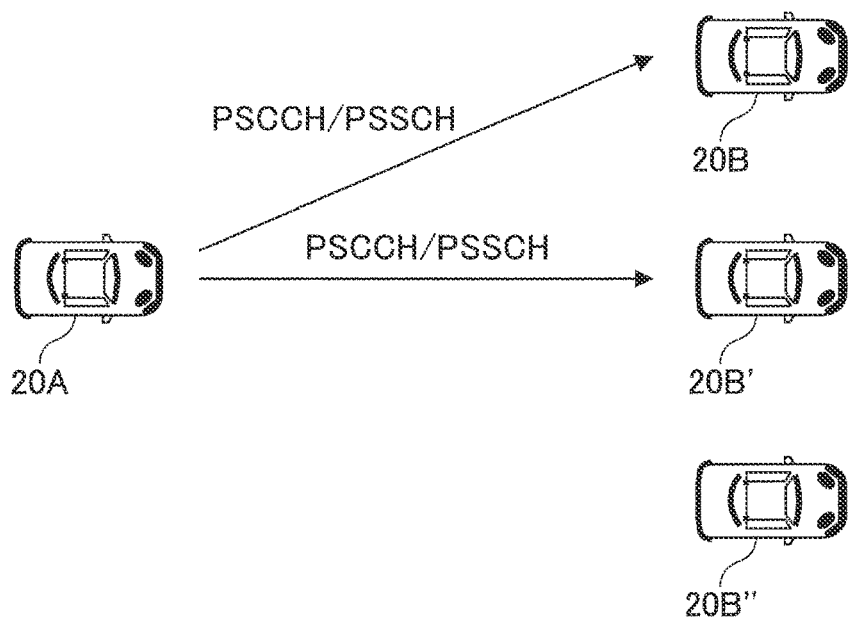
FIG. 9A is a diagram illustrating an example of unicast PSCCH/PSSCH transmission.
Figure 9B:
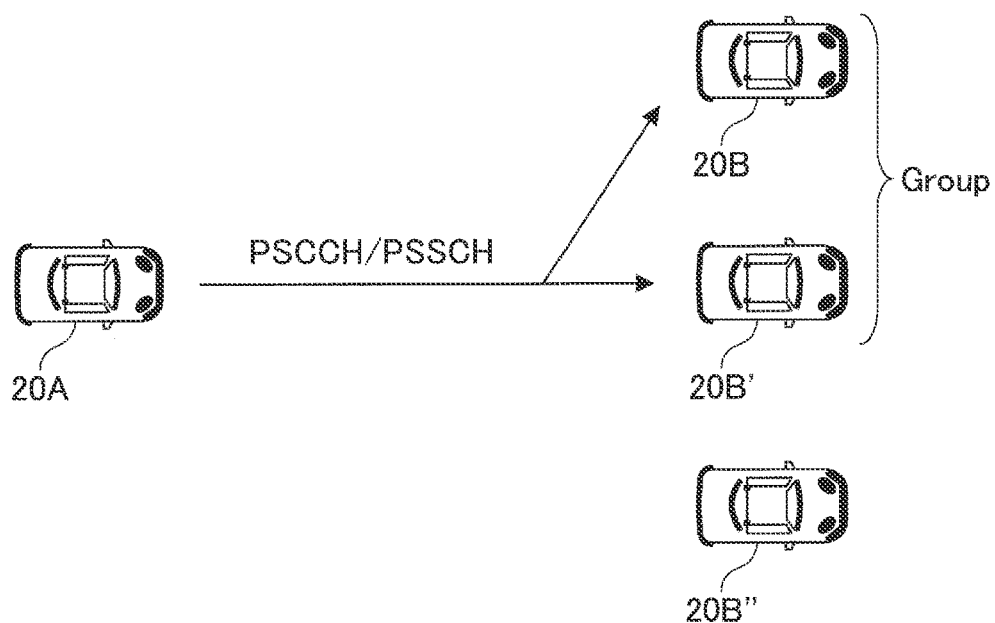
FIG. 9B is a diagram illustrating an example of group cast PSCCH/PSSCH transmission.
Figure 9C:
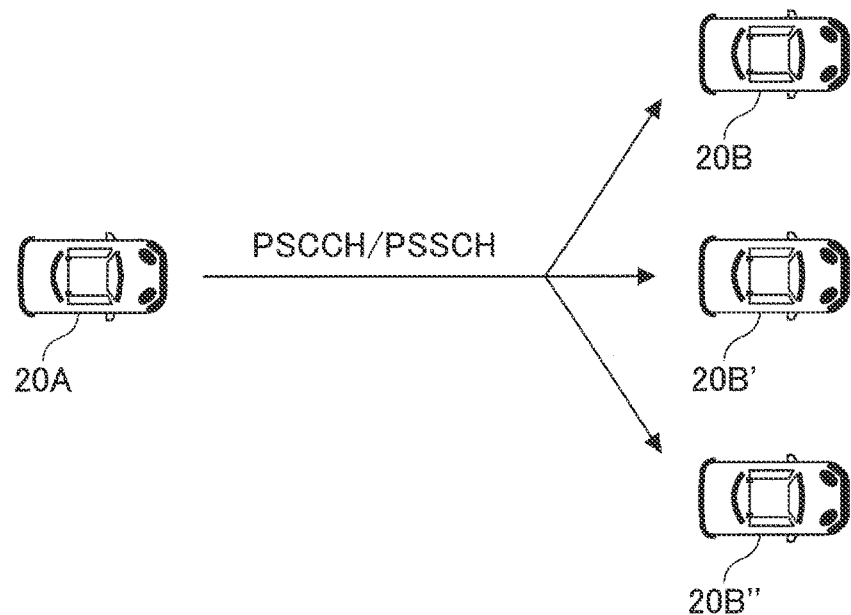
FIG. 9C is a diagram illustrating an example of broadcast PSCCH/PSSCH transmission.

In the NR, as illustrated in FIG. 9A through FIG. 9C, three communication types, which are unicast, groupcast, and broadcast, are currently studied, as types of communication.

FIG. 9A is a diagram illustrating an example of unicast Physical Sidelink Shared Channel (PSCCH)/Physical Sidelink Control Channel (PSSCH) transmission. Unicast refers, for example, to a one-to-one transmission from the transmitting communication apparatus 20A to the receiving communication apparatus 20B.

FIG. 9B is a diagram illustrating an example of group cast PSCCH/PSSCH transmission. A group cast, for example, refers to a transmission from the transmitting communication apparatus 20A to the communication apparatus 20B and a receiving communication apparatus 20B', which are a group of the receiving communication apparatuses 20.

FIG. 9C is a diagram illustrating an example of a broadcast PSCCH/PSSCH transmission. Broadcast refers, for example, to a transmission from the transmitting communication apparatus 20A to the communication apparatus 20B, the communication apparatus 20B', and a communication apparatus 20B" which are all the receiving communication apparatuses 20 within a predetermined range.

In LTE V2X, Hybrid Automatic Repeat reQuest (HARQ) was not supported. In contrast, it has been studied to support HARQ with NR-based V2X. For this reason, in NR, Sidelink Feedback Control Information (SFCI) is defined, and HARQ-ACK is assumed to be transmitted via SFCI. Furthermore, Physical Sidelink Feedback Channel (PSFCH) is defined as a channel for transmitting SFCI. Consensus has been reached to transmit SFCI via PSFCH.

(Measurement Configuration)

According to Non-Patent Document 3, the network can configure an RRC-connected user equipment so as to execute measuring according to a measurement configuration and report a measurement result.

The network can configure the user equipment so as to measure a Synchronization Signal (SS)/Physical Broadcast Channel (PBCH) block and report the measured result.

The network can configure the user equipment to perform measurement on a per Channel State Information (CSI)-Reference Signal (RS) resource basis and report the measurement result.

In this case, the network can configure the user equipment to execute measuring and report a measurement result to the network by transmitting, to the user equipment, a measurement configuration for configuring measurement performed by the user equipment, including parameters (measurement objects) specifying measurement objects (SS/PBCH block; S-PSS/S-SSS/PSBCH; CSI-RS; and the like) and parameters (reporting configurations) specifying a report configuration (a trigger for reporting, a type of a reference signal, a report format, and the like).

As described in the following embodiments, by applying measurement and report method of channel state information (CSI) based on measurement configuration in the existing NR, it is possible to cause the communication apparatus 20 that communicates through a sidelink to report the channel state information of the sidelink communication without making major changes to the system. In the following embodiments, an embodiment for reporting channel state information (CSI) on an aperiodic sidelink communication is described. However, the embodiments of the present invention are not limited to reporting of the channel state information (CSI) on aperiodic sidelink communication. The embodiments of the present invention can also be applied to reporting of CSI on semi-persistent sidelink communication. For example, by replacing details of requesting (trigger) a CSI report with details of activating a CSI report on sidelink communication, the details of the following embodiments can be applied to a CSI report on semi-persistent sidelink communication.

Example 1

In Example 1, the communication apparatus 20B that receives a CSI request (measurement configuration) for a sidelink communication from the communication apparatus 20A performs measurement of a measurement target signal (reference signal and the like) specified in the CSI request of the sidelink communication and reports channel state information (CSI) on the sidelink communication obtained by measuring the signal to the communication apparatus 20A via PSFCH or PSSCH.

Figure 10:
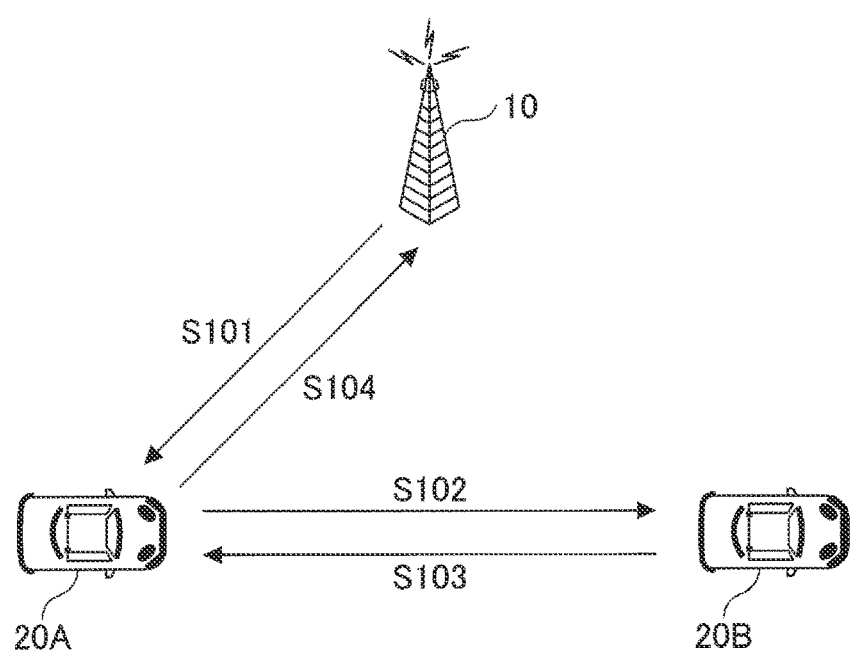
FIG. 10 is a diagram illustrating an operation example of an Example 1.

With reference to FIG. 10, a specific operation example is described. FIG. 10 illustrates a case of SL transmission mode 1 of NR V2X as an operation example. However, the embodiments are not limited to the SL transmission mode 1, and can be applied to SL transmission mode 2 in NR V2X. Furthermore, all of the embodiments or a part of the embodiments can be applied to SL transmission mode 2a in NR V2X, and can also be applied to SL transmission mode 2c in NR V2X.

First, in step S101, the base station 10 transmits a CSI request (measurement configuration) of a sidelink communication to the communication apparatus 20A.

In response to receiving the CSI request of the sidelink communication, the communication apparatus 20A transmits a CSI request of the sidelink communication to the communication apparatus 20B in step S102.

In response to receiving the CSI request of the sidelink communication, the communication apparatus 20B measures a signal (SS/PBCH block; S-PSS/S-SSS/PSBCH; CSI-RS; and the like) on the basis of the CSI request of the sidelink communication in step S103, derives the CSI of the sidelink communication, and reports the derived CSI of the sidelink communication to the communication apparatus 20A.

In response to receiving the CSI of the sidelink communication from the communication apparatus 20B, the communication apparatus 20A reports, to the base station 10, the CSI of the sidelink communication received in step S104.

As described above, the base station 10 that receives the CSI of the sidelink communication from the communication apparatus 20A may perform scheduling of PSFCH and/or PSSCH based on the received CSI of the sidelink communication. As a result, the scheduling of sidelink communication between the communication apparatus 20A and the communication apparatus 20B can be performed more appropriately.

(Option 1)

In the above operation example, the base station 10 may configure the CSI request (measurement configuration) of the sidelink communication so as to cause the communication apparatus 20B to perform measurement of PSFCH and report the result of the measurement.
(Option 2)
Additionally or alternatively, the base station 10 may configure the CSI request (measurement configuration) of the sidelink communication so as to cause the communication apparatus 20B to perform measurement of PSSCH and report the result of the measurement.
(Option 3)
Furthermore, in the above operation example, the base station 10 may include a CSI request of a sidelink communication in scheduling downlink control information (DCI), and the base station 10 may transmit the CSI request of the sidelink communication. At this time, the CSI request of the sidelink communication transmitted to the communication apparatus 20A may include an indication for causing the communication apparatus 20A to transmit a signal for measuring channel state information (SS/PBCH block; S-PSS/S-SSS/PSBCH; CSI-RS; and the like). Furthermore, the CSI request of the sidelink communication transmitted to the communication apparatus 20A may include a user device identity (UE-ID) of the communication apparatus 20A and a UE-ID of the communication apparatus 20B, so that a measurement result obtained by measuring, by the communication apparatus 20B, a signal transmitted from the communication apparatus 20A can be caused to report to the communication apparatus 20A or the base station 10. Additionally, the CSI request of the sidelink communication transmitted to the communication apparatus 20A may include information for causing the communication apparatus 20B to report, to the communication apparatus 20A or the base station 10, a measurement result obtained by measuring, by the communication apparatus 20B, a signal transmitted from the communication apparatus 20A. Alternatively, the CSI request of the sidelink communication transmitted to the communication apparatus 20A may include information for causing the communication apparatus 20A to report, to the base station 10, a measurement result obtained by measuring, by the communication apparatus 20A, a signal transmitted from the communication apparatus 20B. Additionally or alternatively, the CSI request of the sidelink communication transmitted to the communication apparatus 20A may include information for causing the communication apparatus 20B to report, to the base station 10, a measurement result obtained by measuring, by the communication apparatus 20B, a signal transmitted from the communication apparatus 20A and for causing the communication apparatus 20A to report, to the base station 10, a measurement result obtained by measuring, by the communication apparatus 20A, a signal transmitted from the communication apparatus 20B.
(Option 4)
In the above operation example, the CSI request of the sidelink communication is transmitted to the communication apparatus 20B via the communication apparatus 20A. Accordingly, a reporting configuration included in the CSI requests of the sidelink communication configured by the higher layer may be the same between the communication apparatus 20A and the communication apparatus 20B.
(Option 5)
In the above operation example, when the base station 10 includes the CSI request of the sidelink communication in a scheduling DCI and the base station 10 transmits, to the communication apparatus 20A, the CSI request of the sidelink communication, the scheduling DCI may include information specifying a resource for reporting a CSI of sidelink communication in Uu interface (an interface between the base station 10 and the communication apparatus 20A), and/or the scheduling DCI may include information specifying a resource for reporting a CSI of sidelink communication in SL interface (an interface between the communication apparatus 20A and the communication apparatus 20B).
(Option 6)
In the above operation example, when transmission of a CSI request of a sidelink communication from the base station 10 to the communication apparatus 20A in step S101 and reporting of CSI of sidelink communication from the communication apparatus 20A to the base station 10 in step S104 are omitted, this case corresponds to an operation in which, for example, a scheduling sidelink control information (SCI) is transmitted from the communication apparatus 20A to the communication apparatus 20B, and the communication apparatus 20A receives a measurement result via PSFCH or PSSCH from the communication apparatus 20B. Accordingly, the above operation example can be applied to the SL transmission mode 2a in NR V2X and can be applied to the SL transmission mode 2c in NR V2X. Note that, when a CSI request of a sidelink communication associated with CSI reporting setting of the sidelink communication is transmitted from the communication apparatus 20A to the communication apparatus 20B without going through the base station 10, the same CSI reporting setting of the sidelink communication may be preconfigured for the communication apparatus 20A and the communication apparatus 20B.

Example 2

In Example 2, the communication apparatus 20B having received the CSI request of the sidelink communication (measurement configuration) from the communication apparatus 20A measures a signal (reference signal and the like) of a measurement object specified by the CSI request of the sidelink communication, and reports channel state information (CSI) of a sidelink communication obtained by measuring the signal, to the base station 10, via Physical Uplink Control Channel (PUCCH) or Physical Uplink Shared Channel (PUSCH).

Figure 11:
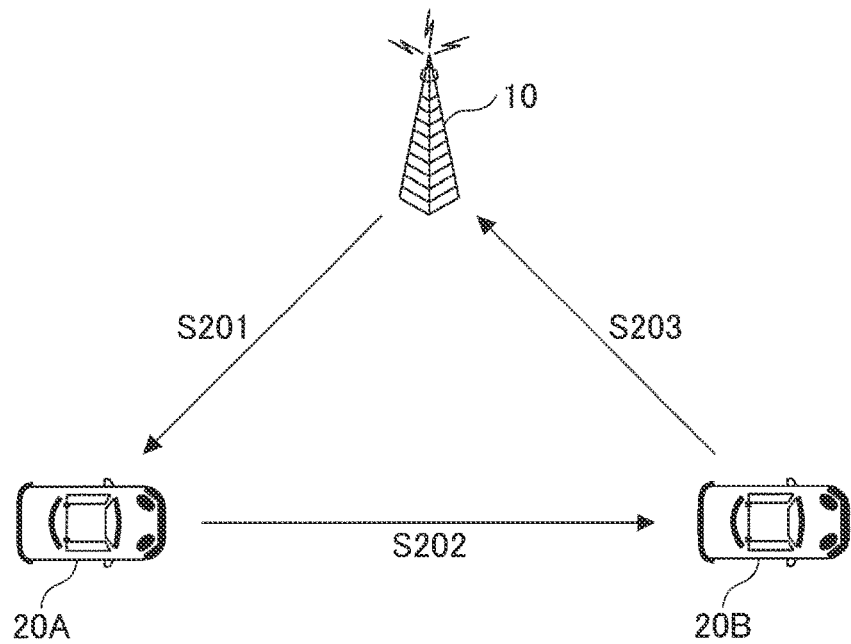
FIG. 11 is a diagram illustrating an operation example of an Example 2.

With reference to FIG. 11, a specific operation example is described. Note that the above-described Options 1 to 6 can be applied to Example 2 by applying appropriate changes as needed.

First, in step S201, the base station 10 transmits a CSI request of a sidelink communication (measurement configuration) to the communication apparatus 20A.

In response to receiving the CSI request of the sidelink communication, the communication apparatus 20A transmits a CSI request of the sidelink communication to the communication apparatus 20B in step S202.

In response to receiving the CSI request of the sidelink communication, the communication apparatus 20B measures a signal (SS/PBCH block; S-PSS/S-SSS/PSBCH; CSI-RS; and the like) on the basis of the CSI request of the sidelink communication in step S203, derives the CSI of the sidelink communication, and reports the derived CSI of the sidelink communication to the base station 10.

As described above, the base station 10 that has received the CSI of the sidelink communication from the communication apparatus 20B may perform scheduling of PSFCH and/or PSSCH on the basis of the received CSI of the sidelink communication. As a result, scheduling of sidelink communication between the communication apparatus 20A and the communication apparatus 20B can be performed more appropriately.

The path for reporting the CSI of the sidelink communication illustrated in FIG. 11 is only the path from the communication apparatus 20B to the base station 10. Accordingly, with the path for reporting the CSI of the sidelink communication as illustrated in FIG. 11, the transmission resource for reporting the CSI of the sidelink communication can be reduced as compared with the path for reporting the CSI of the sidelink communication as illustrated in FIG. 10, i.e., the path extending from the communication apparatus 20B via the communication apparatus 20A to the base station 10.

Example 3

In Example 3, the base station 10 transmits a CSI request of a sidelink communication to the reception side communication apparatus 20B, and receives the CSI of the sidelink communication from the reception side communication apparatus 20B. Unlike the case of Example 1 and Example 2, the base station 10 does not instruct an aperiodic transmission of a signal for channel state information measurement of sidelink communication to the transmitting communication apparatus 20A. In this case, for example, the reception side communication apparatus 20B can calculate the CSI of the sidelink communication by using a period measurement target signal (SS/PBCH block; S-PSS/S-SSS/PSBCH; CSI-RS; and the like) transmission from the transmitting communication apparatus 20A.

Figure 12A:
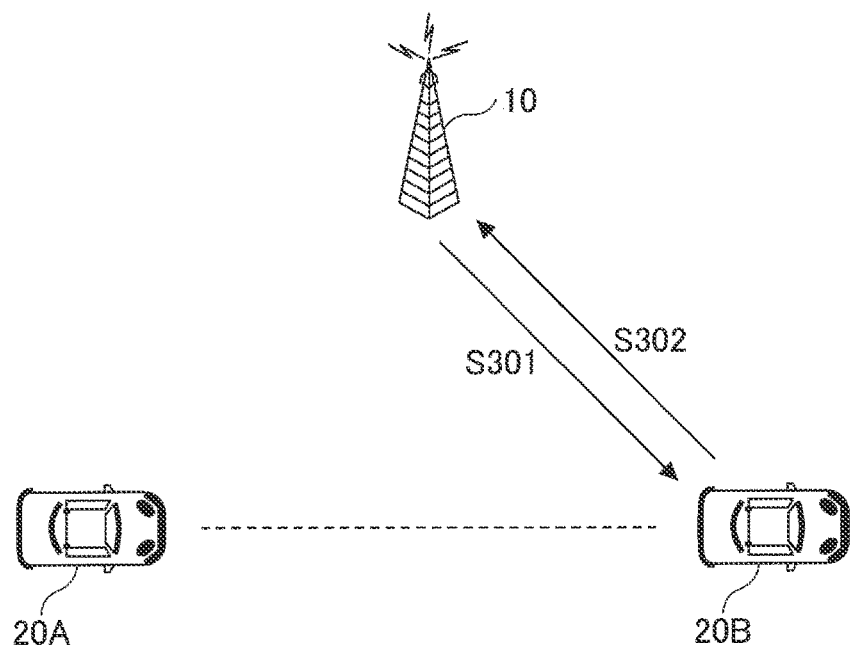
FIG. 12A is a diagram illustrating an operation example of an Example 3.

With reference to FIG. 12A, specific operation example is described.

In step S301, the base station 10 transmits the CSI request of the sidelink communication to the reception side communication apparatus 20B. At this time, the base station 10 does not instruct an aperiodic transmission of a signal for channel state information measurement of sidelink communication to the transmitting communication apparatus 20A.

In step S302, the reception side communication apparatus 20B calculates the CSI of the sidelink communication by using a transmission of a measurement target signal (SS/PBCH block; S-PSS/S-SSS/PSBCH; CSI-RS; and the like) from the transmitting communication apparatus 20A, and transmits the calculated CSI of the sidelink communication to the base station 10.

Figure 12B:
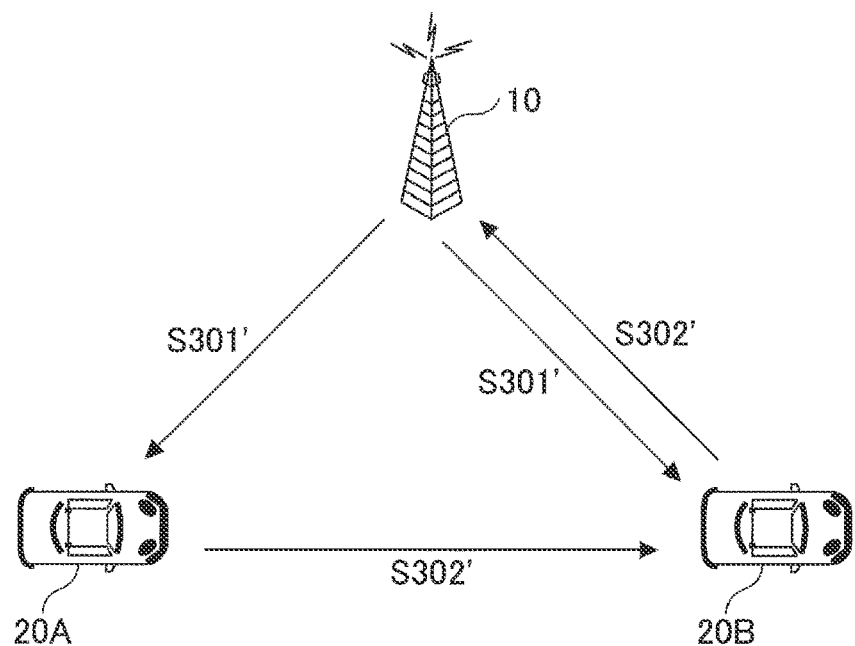
FIG. 12B is a diagram illustrating a modified example of an operation example of the Example 3.

In Example 3, when a report of CSI of sidelink communication from the communication apparatus 20B is based on a transmission of aperiodic measurement target signal (CSI-RS and the like) or a transmission of a semi-persistent measurement target signal (CSI-RS and the like), the base station 10 may request, in step S301' as illustrated in FIG. 12B, the transmitting communication apparatus 20A to transmit an aperiodic measurement target signal (CSI-RS and the like) or to transmit a semi-persistent measurement target signal (CSI-RS and the like), and may report the CSI request of the sidelink communication to the reception side communication apparatus 20B. The transmitting communication apparatus 20A having received a request from the base station 10 may transmit, in step S302', an aperiodic measurement target signal (CSI-RS and the like) or a semi-persistent measurement target signal (CSI-RS and the like), and the reception side communication apparatus 20B may calculate the CSI of the sidelink communication on the basis of the received aperiodic measurement target signal (CSI-RS and the like) or the received semi-persistent measurement target signal (CSI-RS and the like), and transmit the calculated CSI of the sidelink communication to the base station 10.

Example 4

In Example 4, a communication apparatus 20 for transmitting a CSI of the sidelink communication may be switched according to an instruction from the base station 10 or another communication apparatus 20, or according to situations.

For example, the communication apparatus 20 for transmitting a CSI of a sidelink communication may be switched according to a DCI format from the base station 10. For example, when the DCI format transmitted from base station 10 is a DCI format A, the method described in Example 1 may be applied. For example, when the DCI format transmitted from the base station 10 is a DCI format B, the method described in Example 2 may be applied.

Furthermore, for example, a communication apparatus 20 for transmitting a CSI of a sidelink communication may be switched according to an SL transmission mode. For example, in the case of an SL transmission mode 1, the method described in Example 1 may be applied. In the case of an SL transmission mode 2d, the method described in Example 2 may be applied.

For example, a communication apparatus 20 for transmitting a CSI of a sidelink communication may be switched according to a PUCCH/PUSCH resource.

For example, a communication apparatus 20 for transmitting a CSI of sidelink communication may be switched according to an index of CORSET including a CSI request of the sidelink communication in a DCI including the CSI request of the sidelink communication, or according to an index of CCE including a CSI request of the sidelink communication in a DCI including the CSI request of the sidelink communication.

A communication apparatus 20 for transmitting a CSI of a sidelink communication may be switched according to a parameter of a higher layer.

Furthermore, a communication apparatus 20 for transmitting a CSI of a sidelink communication may be switched according to a communication type (unicast, groupcast, broadcast, and the like).

Further, a communication apparatus 20 for transmitting a CSI of a sidelink communication may be switched according to a type of SSB/PBCH. Alternatively, a communication apparatus 20 for transmitting a CSI of a sidelink communication may be switched according to a type of a measurement target signal (CSI-RS and the like). For example, in a case of reporting a CSI of a sidelink communication based on a CSI-RS transmitted periodically, the method described in Example 3 may be applied. In a case of reporting a CSI of a sidelink communication based on a CSI-RS transmitted aperiodically, the method described in Example 2 may be applied.

A communication apparatus 20 for transmitting a CSI of a sidelink communication may be switched according to a type of a report of the CSI of the sidelink communication.

Example 1 to Example 4 described above can be applied to a semi-persistent CSI reporting (SP-CSI reporting). In this case, a scheduling DCI and SCI that requests a CSI report of a sidelink communication can be adopted as a DCI for activation and deactivation of SP-CSI reporting. Here, activation and deactivation of SP-CSI reporting can be performed by a specific combination of DCI scrambled by a dedicated RNTI (dedicated Radio Network Temporary Identifier). The scheduling DCI and SCI that requests the CSI report of the sidelink communication may be replaced with MAC-CE activation/deactivation of SP-CSI notification.

In Example 1 to Example 4 described above, an example in which communication apparatus 20 reports the CSI of the sidelink communication is described. Here, in a case where the communication apparatus 20 reports a CSI of a sidelink communication, in the communication apparatus 20, time and/or frequency resources for notifying the CSI of the sidelink communication may contend (i.e., collide) with time and/or frequency resources for reporting a CSI of another sidelink communication or time and/or frequency resources for reporting a CSI in an Uu interface (an interface between the base station 10 and the communication apparatus 20). In the following example, an operation example in the communication apparatus 20 in a case where such a report of a CSI of a sidelink communication contends with a report of a CSI of another sidelink communication or the report of the CSI of the Uu interface is described.

Example 5-1

In a case where, in the communication apparatus 20, time and/or frequency resources for reporting a CSI of a sidelink communication contend (i.e., collide) with time and/or frequency resources for reporting a CSI in an Uu interface, for example, the communication apparatus 20 may preferentially perform reporting of the CSI in the Uu interface, and the communication apparatus 20 need not perform reporting of the CSI of the sidelink communication.

Example 5-2

In a case where, in the communication apparatus 20, time and/or frequency resources for reporting a CSI of a sidelink communication contend (i.e., collide) with time and/or frequency resources for reporting a CSI in an Uu interface, for example, the communication apparatus 20 may preferentially perform reporting of the CSI of the sidelink communication, and the communication apparatus 20 need not perform reporting of the CSI in the Uu interface.

Example 5-3

In a case where, in the communication apparatus 20, time and/or frequency resources for reporting a CSI of a sidelink communication contend (i.e., collide) with time and/or frequency resources for reporting a CSI in an Uu interface, for example, the communication apparatus 20 may report the CSI of the sidelink communication and the CSI of the Uu interface by multiplexing the CSI of the sidelink communication and the CSI of the Uu interface. In this case, for example, priority order may be assigned in the following order: reporting of an aperiodic CSI, reporting of a semi-persistent CSI via PUSCH, reporting of a semi-persistent CSI via PUCCH, and reporting of a periodic CSI, so that the highest priority is assigned to reporting of an aperiodic CSI, and the lowest priority is assigned to reporting of a periodic CSI, whereby reporting of a high priority CSI may be preferentially performed, and reporting a low priority CSI need not be performed. However, in a case where multi-CSI PUCCH resource is configured, instead of not performing reporting of a semi-persistent CSI via PUCCH and reporting of periodic CSI, the semi-persistent CSI via PUCCH and the periodic CSI may be multiplexed, and reporting of these CSIs may be performed.

Example 5-4

In a case where, in the communication apparatus 20, time and/or frequency resources for reporting a CSI of a sidelink communication contend (i.e., collide) with time and/or frequency resources for reporting a CSI in an Uu interface, for example, the communication apparatus 20 may preferentially perform reporting of a high priority CSI on the basis of a priority order associated with the type of the CSI report, and the communication apparatus 20 need not perform reporting of a low priority CSI. Here, for example, priority order may be assigned in the following order: reporting of a CSI in an aperiodic Uu interface, reporting of a CSI of a aperiodic sidelink communication, reporting of the CSI in the semi-persistent Uu interface via PUSCH, reporting of the CSI of the semi-persistent sidelink communication via PUSCH, reporting of the CSI in the semi-persistent Uu interface via PUCCH, reporting of the CSI of the semi-persistent sidelink communication via PUCCH, reporting of the CSI in the periodic Uu interface, and reporting of the CSI of the periodic sidelink communication, so that the highest priority is given to reporting of a CSI in an aperiodic Uu interface, and the lowest priority is given to reporting of the CSI of the period sidelink communication.

Example 5-5

For example, the communication apparatus 20 may be preconfigured with one of the contention resolution methods from Example 5-1 to Example 5-4 to be applied by a higher layer parameter. Based on that, when, in the communication apparatus 20, time and/or frequency resources for reporting a CSI of a sidelink communication contend (i.e., collide) with time and/or frequency resources for reporting a CSI in an Uu interface, the communication apparatus 20 may apply a preconfigured contention resolution method.

Example 5-6

In a case where, in the communication apparatus 20, time and/or frequency resources for reporting a CSI of a sidelink communication contend (i.e., collide) with time and/or frequency resources for reporting a CSI in an Uu interface, for example, the communication apparatus 20 may report multiple CSIs by simultaneous transmissions through multiple different PUCCHs and PUSCHs.

Example 5-7

The communication apparatus 20 may be configured while assuming that time and/or frequency resources for reporting a CSI of a sidelink communication and time and/or frequency resources for reporting a CSI in an Uu interface are not to be collide. In this case, when time and/or frequency resources for reporting CSI of sidelink communication collide with time and/or frequency resources for reporting CSI of a Uu interface, the communication apparatus 20 may process this case as an error case. Namely, at a stage of scheduling, a configuration may be made so that a collision between time and/or frequency resources for reporting CSI of sidelink communication and time and/or frequency resources for reporting CSI of a Uu interface is avoided.

Example 6-1

In a case where, in the communication apparatus 20, time and/or frequency resources for reporting a CSI of a sidelink communication contend (i.e., collide) with time and/or frequency resources for reporting a CSI of another sidelink communication, for example, the communication apparatus 20 may report the CSI of the sidelink communication and the CSI of the other sidelink communication by multiplexing the CSI of the sidelink communication and the CSI of the other sidelink communication.

Example 6-2

In a case where, in the communication apparatus 20, time and/or frequency resources for reporting a CSI of a sidelink communication contend (i.e., collide) with time and/or frequency resources for reporting a CSI of another sidelink communication, for example, the communication apparatus 20 may report a high priority CSI and the communication apparatus 20 need not report a low priority CSI on the basis of the priority order assigned to the CSI of the sidelink communication and the CSI of the another sidelink communication.

Example 6-3

In a case where, in the communication apparatus 20, time and/or frequency resources for reporting a CSI of a sidelink communication contend (i.e., collide) with time and/or frequency resources for reporting a CSI of another sidelink communication, for example, the communication apparatus 20 may report the CSIs of the multiple sidelink communications by simultaneously transmissions through multiple different PUCCHs and PUSCHs.

In Example 1, Example 2, and Example 3 described above, the base station 10 may be replaced with a communication apparatus 20 having a scheduling function.

(Device Configuration)

Next, a functional configuration example of the base station 10 and the communication apparatus 20 that perform the processing operations described above is described.

<Base Station 10>

Figure 13:
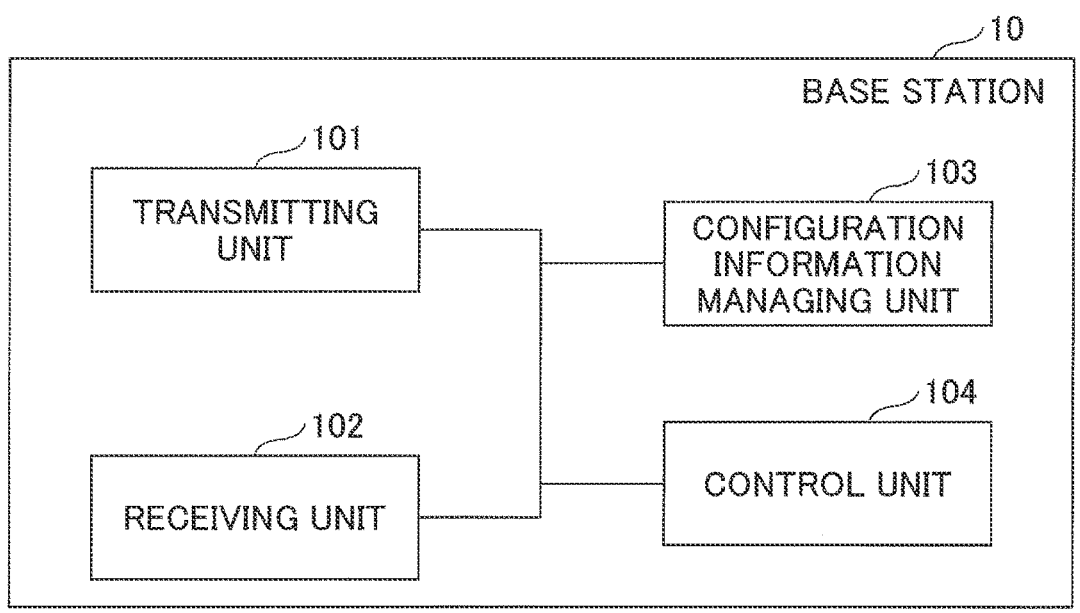
FIG. 13 is a diagram illustrating an example of a functional configuration of a base station 10 according to an embodiment.

FIG. 13 is a diagram illustrating an example of a functional configuration of the base station 10. As illustrated in FIG. 13, the base station 10 includes a transmitting unit 101, a receiving unit 102, a configuration information managing unit 103, and a control unit 104. The functional configuration illustrated in FIG. 13 is merely one example. The functional division and names of functional units may be any division and names, provided that the operation according to the embodiments of the present invention can be performed. Note that the transmitting unit 101 may be referred to as a transmitter, and the receiving unit 102 may be referred to as a receiver.

The transmitting unit 101 includes a function for generating a signal to be transmitted to the communication apparatus 20 side and transmitting the signal through radio. The receiving unit 102 includes a function for receiving various types of signals transmitted from the communication apparatus 20 through radio and obtaining a higher layer signal from the received signal. Furthermore, the receiving unit 102 includes a function for measuring a received signal to obtain a quality value.

The configuration information managing unit 103 stores preconfigured configuration information, configuration information received from the communication apparatus 20, and the like. Note that configuration information related to transmission may be stored in the transmitting unit 101, and configuration information related to reception may be stored in the receiving unit 102. The control unit 104 controls the base station 10. Note that a function of the control unit 104 related to transmission may be included in the transmitting unit, and a function of the control unit 104 related to reception may be included in the receiving unit.

For example, the receiving unit 102 receives a signal including CSI from the communication apparatus 20. The control unit 104 may perform scheduling of PSFCH and/or PSSCH in the communication apparatus 20 based on CSI received from the communication apparatus 20. The control unit 104 generates information indicating determined scheduling, and the transmitting unit 101 transmits a signal including the generated information to the communication apparatus 20.

<Communication Apparatus 20>

Figure 14:
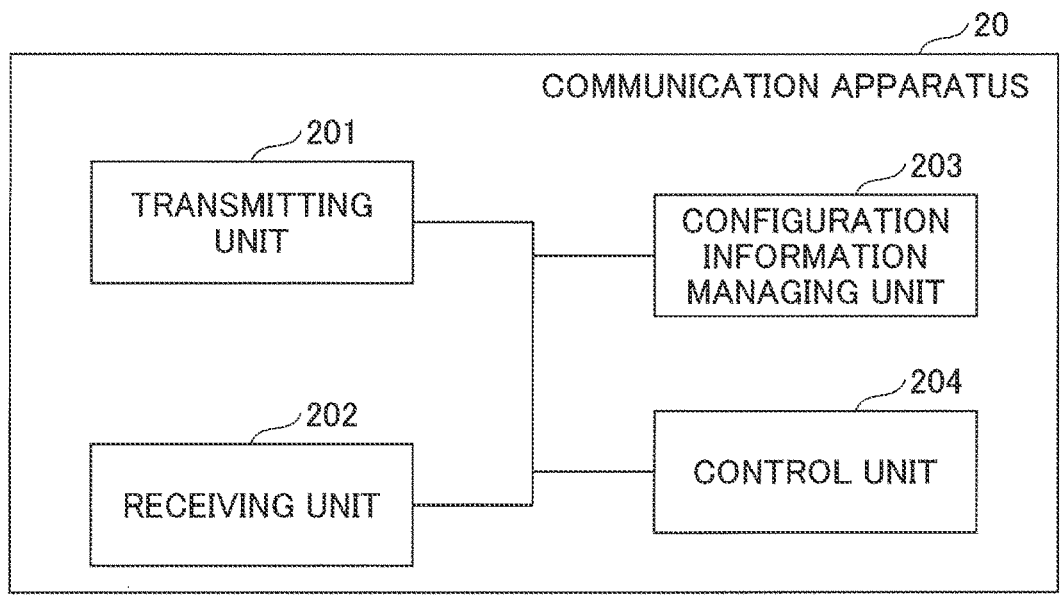
FIG. 14 is a diagram illustrating an example of a functional configuration of a communication apparatus 20 according to an embodiment.

FIG. 14 is a diagram illustrating an example of a functional configuration of the communication apparatus 20. As illustrated in FIG. 14, the communication apparatus 20 includes a transmitting unit 201, a receiving unit 202, a configuration information managing unit 203, and a control unit 204. The functional configuration illustrated in FIG. 14 is merely an example. The functional division and names of functional units may be any division and names, provided that the operation according to the embodiments can be performed. Note that the transmitting unit 201 may be referred to as a transmitting unit, and the receiving unit 202 may be referred to as a receiver. Furthermore, the communication apparatus 20 may be the transmitting communication apparatus 20A or the receiving communication apparatus 20B.

The transmitting unit 201 generates a transmitting signal from transmitting data and transmits the transmitting signal through radio. The receiving unit 202 receives various types of signals and obtains a higher layer signal from the received physical layer signal. The receiving unit 220 includes a function for measuring a received signal and obtaining a quality value.

The configuration information managing unit 203 stores preconfigured configuration information, configuration information received from the base station 10, and the like. The configuration information managing unit 203 may store a CSI request (measurement configuration) received from the base station 10 or another communication apparatus 20 through the receiving unit 202. Note that configuration information related to transmission may be stored in the transmitting unit 201 and configuration information related to reception may be stored in the receiving unit 202. The control unit 204 controls the communication apparatus 20. Note that the function of the control unit 204 related to transmission may be included in the transmitting unit 201, and the function of the control unit 204 related to reception may be included in the receiving unit 202.

For example, the control unit 204 may cause the receiving unit 202 to measure a signal (SS/PBCH block, CSI-RS, and so forth) transmitted from another communication apparatus 20, based on a CSI request (measurement configuration) received by the receiving unit 202 from the base station 10 or another communication apparatus 20; may derive channel state information (CSI) based on a measurement result; and may cause the transmitting unit 201 to transmit the derived CSI.

<Hardware Configuration>

The block diagrams (FIG. 13 to FIG. 14) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 15:
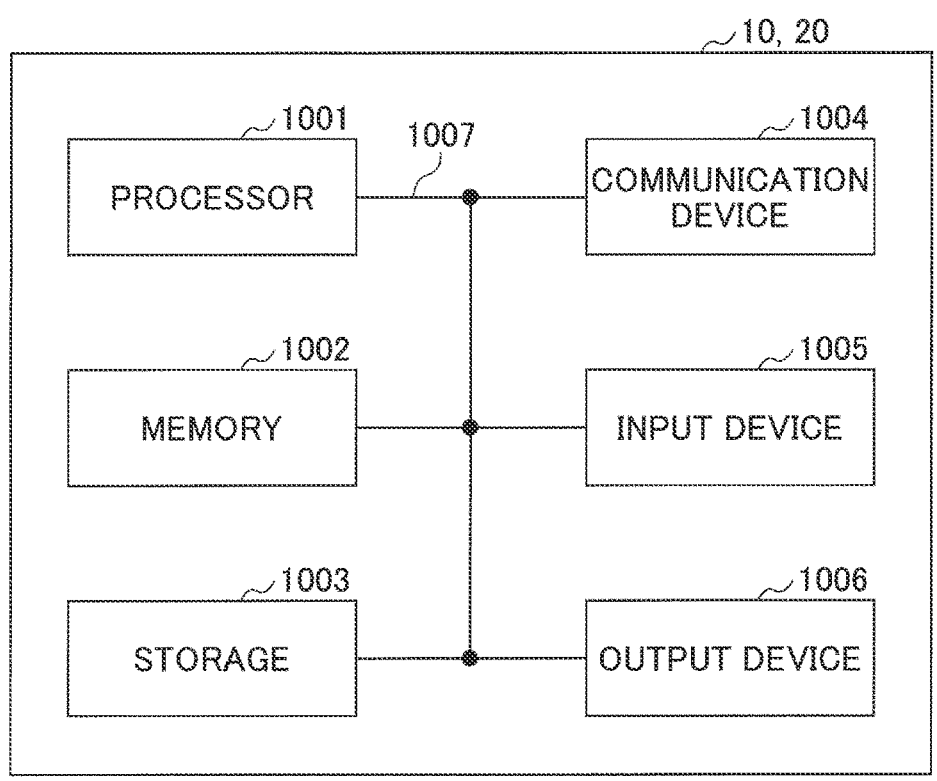
FIG. 15 is a diagram illustrating an example of a hardware configuration of the base station 10 and a communication apparatus 20 according to an embodiment.

For example, the communication apparatus 20 and the base station 10 according to the embodiments of the present invention may function as computers performing the process of the radio communication according to the embodiments of the present invention. FIG. 15 is a diagram illustrating an example of a hardware configuration of the communication apparatus 20 and the base station 10 according to the embodiments. Each of the above-described communication apparatus 20 and base station 10 may be physically configured as a computer device including a processor 1001, a memory 1002, a storage 1003, a communication device 1004, an input device 1005, an output device 1006, a bus 1007, and the like.

Note that, in the following description, the term "device" can be replaced with a circuit, a device, a unit, and so forth. The hardware configuration of the communication apparatus 20 and the base station 10 may be configured to include one or more of the devices depicted in the figures, which are indicated by 1001 through 1006, or may be configured without some devices.

Each function of the communication apparatus 20 and the base station 10 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and the like. For example, the above-described baseband signal processing unit 104, call control unit 105, and the like may be implemented by the processor.

Additionally, the processor 1001 reads a program (program code), a software module, data, and so forth, from at least one of the storage 1003 and the communication device 1004 to the memory 1002, and executes various processes according to these. As the program, a program is used which causes a computer to execute at least a part of the operations described in the above-described embodiments. For example, the control unit 401 of the communication apparatus 20 may be implemented by a control program that is stored in the memory 1002 and that is operated by the processor 1001, and another functional block may be implemented similarly. The above-described various processes are described to be implemented by a single processor. However, the above-described various processes may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and so forth. The memory 1002 may be referred to as a register, a cache, a main memory (main storage device), etc.

The memory 1002 may store a program (program code), a software module, etc., which can be executed for implementing the radio communication method according to the embodiments of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, and so forth. The communication device 1004 may be configured to include, for example, a high frequency switch, a duplexer, a filter, a frequency synthesizer, and so forth, to implement at least one of frequency division duplex (FDD: Frequency Division Duplex) and time division duplex (TDD: Time Division Duplex). For example, the above-described transmitting and receiving antenna 101, an amplifier 102, the transmitting and receiving unit 103, a transmission line interface 106 and the like may be implemented by the communication device 1004. The transmitting and receiving unit 103 may be implemented so that a transmitting unit 103a and a receiving unit 103b are physically or logically separated.

The input device 1005 is an input device (e.g., a keyboard, mouse, microphone, switch, button, sensor, or the like) that receives an external input. The output device 1006 is an output device (e.g., a display, speaker, LED lamp, or the like) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The communication apparatus 20 and the base station 10 may each include hardware, such as a microprocessor, a digital signal processor (DSP: Digital Signal Processor), an Application Specific Integrated Circuit (ASIC), a Programmable Logic Device (PLD), and a Field Programmable Gate Array (PFGA), which may implement some or all of each functional block. For example, processor 1001 may be implemented using at least one of these hardware components.

Conclusion of the Embodiments

In this specification, at least the following communication apparatus and channel state information measuring method are disclosed.

A communication apparatus including a receiving unit that receives a request signal for requesting to measure sidelink channel state information; a control unit that derives the sidelink channel state information based on a signal that is transmitted from a transmitting communication apparatus via a sidelink and received by the receiving unit, based on the request signal; and a transmitting unit that transmits the derived sidelink channel state information.

According to the above-described configuration, by applying a method of measuring and reporting channel state information in NR, a communication apparatus performing sidelink communication can be caused to report channel state information of sidelink communication, without adding major changes to the system. Furthermore, a transmitting communication apparatus or a base station that receives the CSI of the sidelink communication can perform scheduling of PSFCH and/or PSSCH based on the received CSI of the sidelink communication. As a result, scheduling of a sidelink communication between a transmitting communication apparatus and a receiving communication apparatus can be performed more appropriately.

The receiving unit may receive the request signal transmitted from a base station through the transmitting communication apparatus via the sidelink, and the transmitting unit may transmit the derived channel state information to the transmitting communication apparatus via the sidelink.

According to the above-described configuration, by applying a method of measuring and reporting channel state information in NR downlink, a communication apparatus performing sidelink communication can be caused to report channel state information of sidelink communication, without adding major changes to the system.

The control unit may set a destination of the derived channel state information to the transmitting communication apparatus based on an identifier of the transmitting communication apparatus included in the request signal, and the control unit may cause the transmitting unit to transmit the sidelink channel state information to the transmitting communication apparatus through a sidelink resource specified by the request signal.

According to the above-described configuration, a receiving communication apparatus that derives sidelink channel state information can efficiently determine a destination of the derived sidelink channel state information and a transmission resource of the channel state information based on information preconfigured by a higher layer.

The receiving unit may receive, without going through the transmitting communication apparatus, the request signal transmitted from a base station; the control unit may derive the sidelink channel state information based on signals periodically transmitted from the transmitting communication apparatus, and the transmitting unit may transmit, not through the transmitting communication apparatus, the derived channel state information to the base station.

According to the above configuration, as compared to transmitting the sidelink channel state information to the base station via the transmitting communication apparatus, the number of paths for transmitting the sidelink channel state information can be reduced. Accordingly, the transmission resources for reporting the sidelink channel state information can be reduced. In addition, the sidelink channel state information can be measured by using the signals periodically transmitted by the transmitting communication apparatus without instructing the transmitting communication apparatus to transmit an aperiodic reference signal and the like.

Upon detecting that a transmission resource for transmitting the sidelink channel state information collides with a transmission resource for transmitting downlink channel state information, the control unit may cause the transmitting unit to transmit channel state information with the highest in priority, and the control unit may cause the transmitting unit to refrain from transmitting channel state information with the lowest in priority, based on priority configured for the sidelink channel state information and the downlink channel state information.

According to the above-described configuration, in a case where, in the communication apparatus, a transmission resource for transmitting sidelink channel state information collides with a transmission resource for transmitting downlink channel state information, the collide of resources can be efficiently resolved.

A channel state measuring method by a communication apparatus, the method including a step of receiving a request signal for requesting to measure sidelink channel state information; a step of deriving the sidelink channel state information based on a signal that is received from a transmitting communication apparatus via a sidelink, based on the request signal; and a step of transmitting the derived sidelink channel state information.

According to the above-described configuration, by applying a method of measuring and reporting channel state information in NR, a communication apparatus performing sidelink communication can be caused to report channel state information of sidelink communication, without adding major changes to the system. Furthermore, a transmitting communication apparatus or a base station that receives the CSI of the sidelink communication can perform scheduling of PSFCH and/or PSSCH based on the received CSI of the sidelink communication. As a result, scheduling of a sidelink communication between a transmitting communication apparatus and a receiving communication apparatus can be performed more appropriately.

Supplemental Embodiments

While the embodiments of the present invention are described above, the disclosed invention is not limited to the embodiments, and those skilled in the art will appreciate various alterations, modifications, alternatives, substitutions, etc. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (provided that there is no contradiction) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiments, the order of processing may be changed as long as there is no contradiction. For the convenience of the description of the process, the communication apparatus 20 and the base station 10 are described using functional block diagrams, but such devices may be implemented in hardware, software, or a combination thereof. Software operated by a processor included in the communication apparatus 20 in accordance with embodiments of the present invention and software operated by a processor included in the base station 10 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, etc.

The aspects/embodiments described in this disclosure may be applied to a system using at least one of Long Term Evolution (LTE), LTE-Advanced LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, etc., of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station 10 may be performed by an upper node in some cases. It is apparent that in a network consisting of one or more network nodes having the base station 10, various operations performed for communicating with the communication apparatus may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information, etc., may be stored in a specific location (e.g., memory) or managed using management tables. Input and output information, etc., may be overwritten, updated, or added. Output information, etc., may be deleted. The input information, etc., may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information"). While the present disclosure is described in detail above, those skilled in the art will appreciate that the present disclosure is not limited to the embodiments described in this specification. The present disclosure may be implemented as modifications and variations without departing from the gist and scope of the present disclosure as defined by the claims. Accordingly, the description of the present disclosure is for purposes of illustration and is not intended to have any limiting meaning with respect to the present disclosure.

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and the like.

Software, instructions, information, and the like, may also be transmitted and received via a transmission medium. For example, when software is transmitted from a website, server, or other remote source using at least one of wireline technology (such as coaxial cable, fiber optic cable, twisted pair, digital subscriber line (DSL: Digital Subscriber Line)) and wireless technology (infrared, microwave, etc.), at least one of these wireline technology and wireless technology is included within the definition of a transmission medium.

The information, signals, etc., described in this disclosure may be represented using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced with terms having the same or similar meanings. For example, at least one of the channels and the symbols may be a signal (signaling). The signal may also be a message. Furthermore, a component carrier (CC: Component Carrier) may be referred to as a carrier frequency, a cell, a frequency carrier, or the like.

As used in this disclosure, the terms "system" and "network" are used interchangeably. The information, parameters, etc., described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH, PDCCH, etc.) and information elements can be identified by any suitable name, the various names assigned to these various channels and information elements are not in any way limiting.

In this disclosure, the terms "Base Station (BS: Base Station)," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," and the like, may be used interchangeably. The base station may be called by a term, such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user communication apparatus", "user equipment (UE: User Equipment)", "communication apparatus", etc., may be used interchangeably.

A mobile station may be referred to by one of ordinary skill in the art as a subscriber station, a mobile unit, a subscriber unit, a wireless unit, a remote unit, a mobile device, a wireless device, a wireless communication apparatus, a remote device, a mobile subscriber station, an access communication apparatus, a mobile communication apparatus, a wireless communication apparatus, a remote communication apparatus, a handset, a user agent, a mobile client, a client, or some other suitable term.

At least one of a base station and a mobile station may be referred to as a transmitter, receiver, a communication apparatus, etc. At least one of a base station and a mobile station may be a device installed in a mobile body, a mobile body itself, etc. The mobile body may be a vehicle (e.g., a car, an airplane, etc.), an unmanned mobile (e.g., a drone, an automated vehicle, etc.), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be read by the user terminal. For example, various aspects/embodiments of the present disclosure may be applied to a configuration in which communication between the base stations and the user terminal is replaced with communication between multiple user terminals (e.g., may be referred to as Device-to-Device (D2D), Vehicle-to-Everything (V2X), etc.). In this case, a configuration may be such that the above-described function of the base station 10 is included in the user terminal 20. The terms "up" and "down" may also be replaced with the terms corresponding to communication apparatus-to-communication apparatus communication (e.g., "side"). For example, an uplink channel, a downlink channel, etc., may be replaced with a sidelink channel. Similarly, a user terminal according to the present disclosure may be replaced with a base station. In this case, a configuration may be such that, the function included in the above-described user terminal 20 is included in the base station 10.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated," "coupled," etc., may also be interpreted similarly.

While the present invention is described in detail above, those skilled in the art will appreciate that the present invention is not limited to the embodiments described in this specification. The present invention may be implemented as modifications and variations without departing from the gist and scope of the present invention as defined by the claims. Accordingly, the description of the specification is for illustrative purposes only and is not intended to have any restrictive meaning with respect to the present invention.

LIST OF REFERENCE SYMBOLS

101 transmitting unit
102 receiving unit
103 configuration information managing unit
104 control unit
201 transmitting unit
202 receiving unit
203 configuration information managing unit
204 control unit
1001 processor
1002 memory
1003 storage
1004 communication apparatus
1005 input device
1006 output device

The invention claimed is:

1. A terminal for performing sidelink communication, the terminal comprising:
   a receiving unit that receives, from another terminal, a measurement configuration for the sidelink communication;
   a control unit that performs, based on the measurement configuration for the sidelink communication, a measurement of a demodulation reference signal (DMRS) for the sidelink communication; and a transmitting unit that transmits a result of the measurement of the DMRS for the sidelink communication to the another terminal,
wherein, when a sidelink transmission of the result of the measurement of the DMRS contends with an uplink transmission of a channel state information (CSI) report to be transmitted to a base station, the transmitting unit performs only a transmission with a higher priority between the sidelink transmission and the uplink transmission.

2. The terminal of claim 1, wherein the measurement configuration includes a report setting.

3. A terminal for performing sidelink communication, the terminal comprising:
  a transmitting unit that transmits, to another terminal, a measurement configuration for the sidelink communication; and
  a receiving unit that receives, based on the measurement configuration for the sidelink communication, a result of the measurement of the DMRS for the sidelink communication from the another terminal,
  wherein the transmitting unit transmits, based on the measurement configuration for the sidelink communication, the DMRS for the sidelink communication, and
  wherein, when a sidelink transmission of the result of the measurement of the DMRS contends with an uplink transmission of a channel state information (CSI) report to be transmitted to a base station, the another terminal performs only a transmission with a higher priority between the sidelink transmission and the uplink transmission.

4. The terminal of claim 3, wherein the measurement configuration includes a report setting.

5. A sidelink communication method executed by a terminal, the method comprising:
  receiving, from another terminal, a measurement configuration for the sidelink communication;
  performing, based on the measurement configuration for the sidelink communication, a measurement of a demodulation reference signal (DMRS) for the sidelink communication;
  transmitting a result of the measurement of the DMRS for the sidelink communication to the another terminal; and
  when a sidelink transmission of the result of the measurement of the DMRS contends with an uplink transmission of a channel state information (CSI) report to be transmitted to a base station, performing only a transmission with a higher priority between the sidelink transmission and the uplink transmission.

6. A system for performing sidelink communication between a first terminal and a second terminal, the system comprising the first terminal and the second terminal,
  wherein the first terminal includes:
    a first transmitting unit that transmits, to the second terminal, a measurement configuration for the sidelink communication; and
    a first receiving unit that receives, based on the measurement configuration for the sidelink communication, a result of a measurement of a Demodulation Reference Signal (DMRS) for the sidelink communication from the second terminal,
    wherein the first transmitting unit transmits, based on the measurement configuration for the sidelink communication, the DMRS for the sidelink communication, and
  wherein the second terminal includes:
    a second receiving unit that receives, from the first terminal, the measurement configuration for the sidelink communication,
    a control unit that performs, based on the measurement configuration for the sidelink communication, the measurement of the DMRS for the sidelink communication, and
    a second transmitting unit that transmits a result of the measurement of the DMRS for the sidelink communication to the first terminal,
    wherein, when a sidelink transmission of the result of the measurement of the DMRS contends with an uplink transmission of a channel state information (CSI) report to be transmitted to a base station, the second transmitting unit performs only a transmission with a higher priority between the sidelink transmission and the uplink transmission.

* * * * *